United States Patent [19]
Takeuchi

[11] Patent Number: 5,363,301
[45] Date of Patent: Nov. 8, 1994

[54] CONTROL SYSTEM FOR VEHICLE SAFETY DEVICE

[75] Inventor: Kunihiro Takeuchi, Saitama, Japan

[73] Assignee: ZEXEL Corporation, Tokyo, Japan

[21] Appl. No.: 837,948

[22] Filed: Feb. 20, 1992

[30] Foreign Application Priority Data

Mar. 13, 1991 [JP] Japan .................................. 3-072179

[51] Int. Cl.⁵ .............................................. B60R 21/02
[52] U.S. Cl. .................................. 364/424.05; 180/282; 280/735; 307/10.1
[58] Field of Search ............... 364/424.05; 180/271, 180/281, 282; 280/734, 735; 307/10.1

[56] References Cited

U.S. PATENT DOCUMENTS

| | | | |
|---|---|---|---|
| 3,911,391 | 10/1975 | Held et al. | 280/735 X |
| 4,410,875 | 10/1983 | Spies et al. | 280/735 X |
| 4,985,835 | 1/1991 | Sterler et al. | 364/424.05 |
| 4,994,972 | 2/1991 | Diller | 364/424.05 |
| 5,037,129 | 8/1991 | Fritz et al. | 280/734 |
| 5,040,118 | 8/1991 | Diller | 364/424.05 |
| 5,129,673 | 7/1992 | Mattes et al. | 280/735 |
| 5,157,268 | 10/1992 | Spies et al. | 307/10.1 |
| 5,225,985 | 7/1993 | Okano | 364/424.05 |
| 5,262,949 | 11/1993 | Okano et al. | 364/424.05 |

*Primary Examiner*—Thomas G. Black
*Assistant Examiner*—Collin W. Park

[57] ABSTRACT

In a control system for a vehicle safety device, when in addition to the condition that a total integral value of the acceleration and deceleration represented by a signal of an acceleration sensor exceeds a threshold level, the condition that the acceleration integral value becomes predetermined times greater than the deceleration integral value is satisfied, a trigger signal is outputted to the vehicle safety device.

5 Claims, 4 Drawing Sheets

CONTROL SYSTEM FOR VEHICLE SAFETY DEVICE

BACKGROUND OF THE INVENTION

This invention relates to a control system for a vehicle safety device such as an air bag.

For example, as disclosed in U.S. Pat. No. 4,853,623 and Japanese Laid-Open Utility Model Application No. 2-5371, a control system for an air bag comprises an acceleration sensor, a signal processing circuit, such as a microcomputer, for processing a signal from the acceleration sensor, and a drive circuit for driving the air bag.

The signal outputted from the acceleration sensor represents one of voltages higher and lower than a reference voltage during the acceleration of a vehicle, and represents the other voltage during the deceleration of the vehicle. The microcomputer inputs and integrates the signal from the acceleration sensor at a predetermined cycle, and compares this integral value with a threshold level. This integral value represents a change in the speed of the vehicle, and increases in the decelerating direction upon collision of the vehicle. When the integral value exceeds the threshold level, the microcomputer judges that a collision has occurred, and outputs a trigger signal to the drive circuit to expand the air bag.

During the repair of the vehicle in a fixed condition, when an impact is applied to the vehicle by a hammer, a sensor signal of a very large amplitude is produced alternately in accelerating and decelerating directions. The acceleration and the deceleration at this time are generally equal in magnitude to each other. Therefore, when this hammer blow is applied, the integral value of the signal of the acceleration sensor calculated by the microcomputer must be kept generally at zero, and hence the air bag must be kept in an unexpanded condition. However, there remains the possibility of erroneous expansion of the air bag for the following reason. The microcomputer effects the sampling of the sensor signal at predetermined time intervals, and therefore there is a possibility that the sampling of the sensor signal is consecutively effected by accident when the deceleration is large whereas the acceleration is small. In this case, since the absolute value of the signal is very large, the integral value of the sensor signal increases in the decelerating direction, and exceeds the threshold level, thereby inviting an erroneous expansion of the air bag.

In order to reduce the possibility of erroneous expansion of the air bag when the above hammer blow is applied, the cycle of the sampling of the sensor signal may be shortened so as to increase the precision of the integral calculation. However, there is a limitation on this method. When the threshold level is set to a higher level in order to prevent the erroneous expansion of the air bag, it takes long time for the integral value of the deceleration to reach the threshold level when an actual collision occurs, so that the expansion of the air bag is delayed.

SUMMARY OF THE INVENTION

It is an object of this invention to provide a control system which can prevent an erroneous operation of a vehicle safety device when a sensor signal fluctuates with large amplitudes alternately in accelerating and decelerating directions, for example, upon application of a hammer blow, and can rapidly operate the vehicle safety device at the time of collision of the vehicle.

According to the present invention, there is provided a control system for a vehicle safety device comprising:
 (a) an acceleration sensor for outputting a signal representative of both of acceleration and deceleration of a vehicle;
 (b) total integral value calculation means for effecting an integral calculation in accordance with the signal from the acceleration sensor to produce a total integral value representative of a change in speed of the vehicle;
 (c) first comparison means for comparing the total integral value with a threshold level;
 (d) deceleration integrating means for integrating the deceleration component of the signal from the acceleration sensor to produce a deceleration integral value;
 (e) acceleration integrating means for integrating the acceleration component of the signal from the acceleration sensor to produce an acceleration integral value;
 (f) second comparison means for comparing the deceleration integral value with the acceleration integral value; and
 (g) trigger signal outputting means for outputting a trigger signal to the vehicle safety device when the first comparison means judges that the total integral value increasing in the decelerating direction exceeds the threshold level, and at the same time when the second comparison means judges that the deceleration integral value becomes predetermined times greater than the acceleration integral value.

DESCRIPTION OF THE PREFERRED EMBODIMENTS

Figure 1:
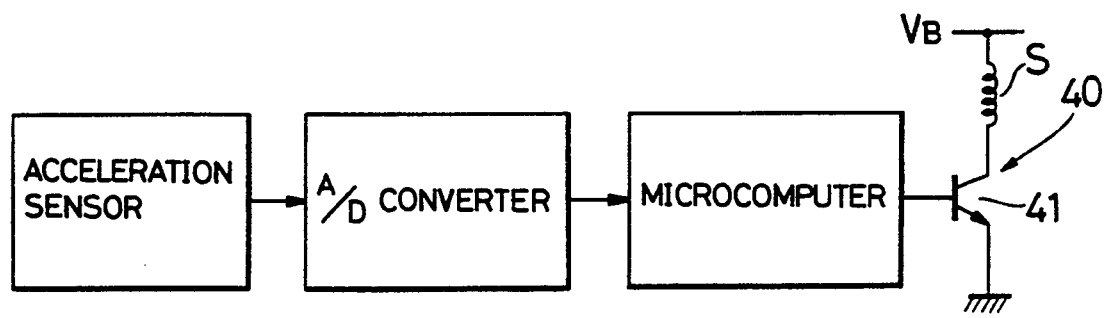
FIG. 1 is a circuit diagram showing a general construction of a control system of the present invention.

One preferred embodiment of the present invention will now be described with reference to the drawings. FIG. 1 shows a general construction of a control system for controlling a squib S of an air bag (vehicle safety device). This control system comprises an acceleration sensor 10 for outputting a voltage signal in accordance with the acceleration and deceleration of a vehicle, an analog-to-digital converter (ADC) 20 for converting the output voltage signal of the acceleration sensor 10 into digital data, a microcomputer 30 for processing the digital signal from the ADC 20, and a drive circuit 40 for driving the squib S. The acceleration sensor 10 outputs the voltage higher than a reference voltage when the vehicle is decelerating, and also outputs the voltage lower than the reference voltage when the vehicle is accelerating.

The drive circuit 40 includes an emitter-grounded transistor 41, and the squib S is connected between the collector of the transistor 41 and a battery $V_B$. When a trigger signal of a high level is supplied from the microcomputer 30 to the base of the transistor 41, the transistor 41 is turned on to ignite the squib S, thereby expanding the air bag.

Figure 2:
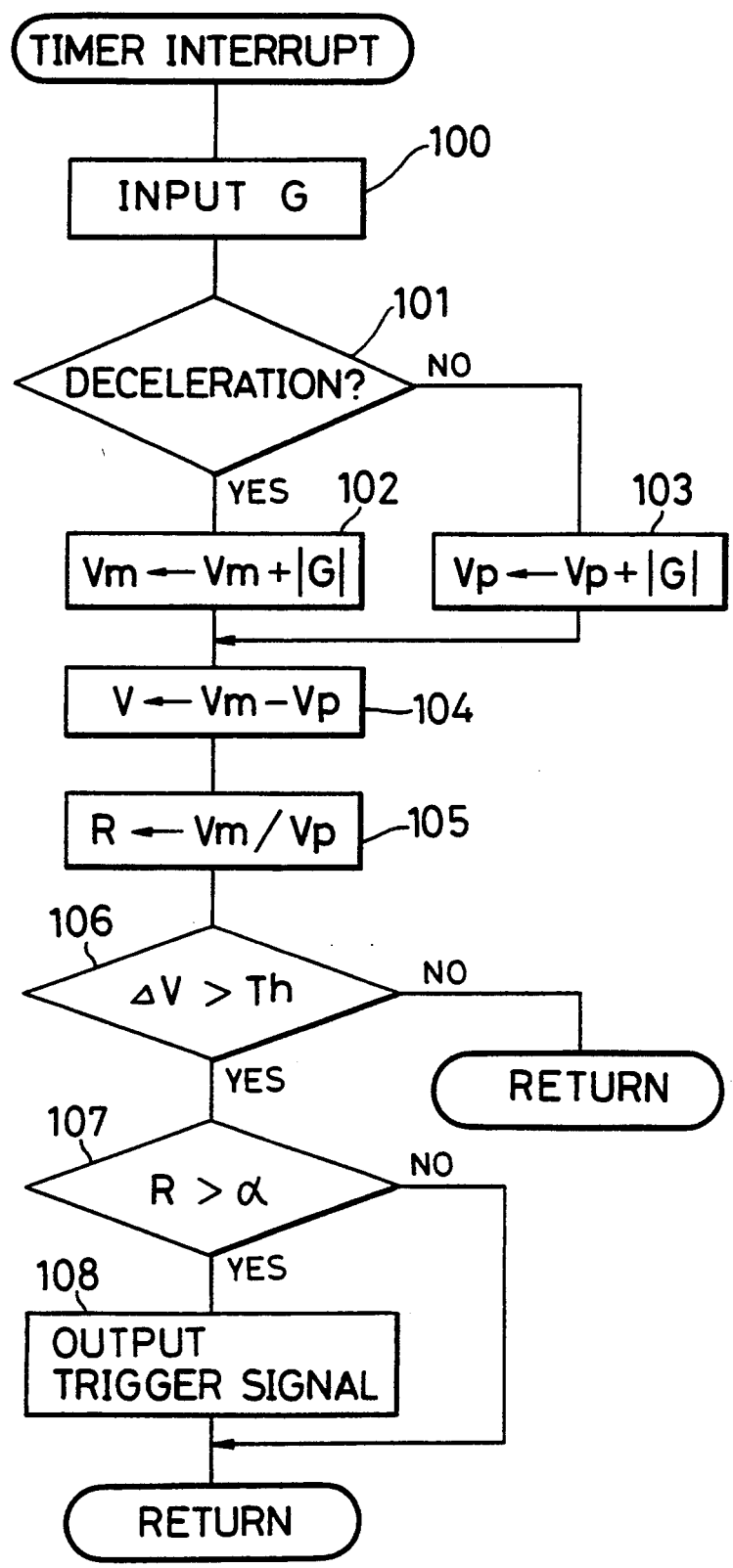
FIG. 2 is a flow chart of a timer interrupt routine executed by a microcomputer.

The microcomputer 30 executes a timer interrupt routine of FIG. 2 at a predetermined cycle (at predetermined time intervals). First, the microcomputer 30 inputs the sensor signal G from the acceleration sensor 10 via the ADC 20 (Step 100). The sensor signal G is so converted as to represent the deceleration in terms of a positive value and to represent the acceleration in terms of a negative value. Then, it is judged whether or not the sensor signal G represents the deceleration (Step 101). If the judgment result in Step 101 is "YES", the absolute value $|G|$ of the deceleration inputted at this time is added to an integral value Vm of the deceleration, obtained at the preceding interrupt routine, to obtain a new integral value Vm of the deceleration (Step 102). If the judgment result in Step 101 is "NO", the absolute value $|G|$ of the acceleration inputted at this time is added to an integral value Vp of the acceleration, obtained at the preceding interrupt routine, to obtain a new integral value Vp of the acceleration (Step 103). In this manner, The acceleration and the deceleration are integrated independently of each other.

Then, by subtracting the acceleration integral value Vp from the deceleration integral value Vm, a total integral value $\Delta V$, representing the amount of change of the vehicle speed, is obtained (Step 104). Then, by dividing the deceleration integral value Vm by the acceleration integral value Vp, an integral value ratio R is obtained (Step 105).

Then, it is judged whether or not the total integral value $\Delta V$ exceeds a threshold level Th (Step 106). If the judgment result is "NO", the program returns to a main routine. In contrast, if the judgment result in Step 106 is "YES", it is judged whether or not the integral value ratio R exceeds a predetermined value $\alpha$ ($\alpha > 1$) (Step 107). If the judgment result in Step 107 is "YES", the microcomputer 30 outputs the trigger signal to the transistor 41 to expand the air bag (Step 108), and then the program returns to the main routine. If the judgment result in Step 107 is "NO", the program skips Step 108, and returns to the main routine.

In the above interrupt routine of the microcomputer 30, the trigger signal is not outputted only when the total integral value $\Delta V$ exceeds the threshold level Th. Another requirement for outputting the trigger signal is that the integral value ratio R should exceeds the predetermined value $\alpha$, that is to say, that the deceleration integral value Vm should be predetermined times ($\alpha$) larger than the acceleration integral value Vp. Advantages of this additional requirement will be described with reference to FIGS. 3 and 4.

Figure 3A:
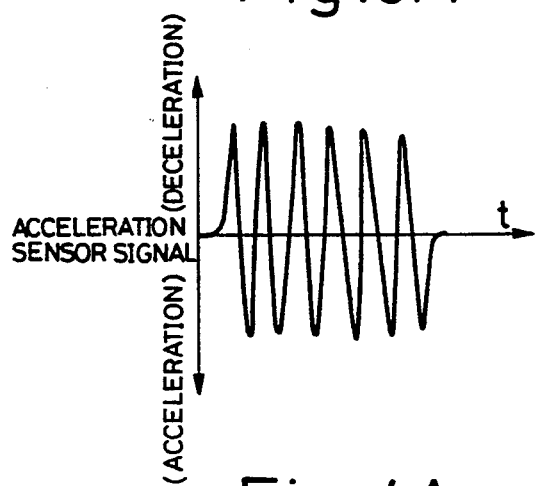
FIG. 3(A) is a diagrammatical illustration showing a signal of an acceleration sensor upon application of a hammer blow.
Figure 3B:
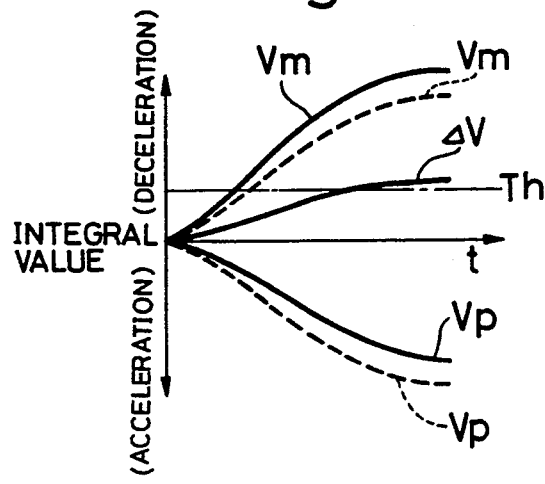
FIG. 3(B) is a diagrammatical illustration showing an integral value of the acceleration, an integral value of the deceleration and a total integral value which are calculated based on the signal of FIG. 3(A)

As shown in FIG. 3A, although the sensor signal G, produced upon application of a hammer blow, has a very large amplitude, the magnitude of this signal G in the decelerating direction is generally equal to the magnitude thereof in the accelerating direction. Therefore, if the cycle of the above timer interrupt is very short, the deceleration integral value Vm and the acceleration integral value Vp increase at generally the same rate, as indicated in broken lines in FIG. 3B. As a result, the total integral value $\Delta V = Vm - Vp$ must be kept generally at zero. Actually, however, there is a limitation on the shortening of the timer interrupt cycle, and depending on the timing of the timer interrupt, that is, the timing of sampling of the sensor signal, there is a possibility that the deceleration integral value Vm increases at a higher rate than the acceleration integral value Vp, as indicated in solid lines in FIG. 3B. In this case, the total integral value $\Delta V$ tends to increase in the decelerating direction as indicated in a solid line, and may exceed the threshold level Th. However, the ratio R of the deceleration integral value Vm to the acceleration integral value Vp is kept to a relatively small value, and does not exceed the predetermined value $\alpha$. Therefore, even if the timing of sampling of the sensor signal is not ideal upon application of the hammer blow, the trigger signal is not outputted, so that an erroneous expansion of the air bag can be positively prevented.

Figure 4A:
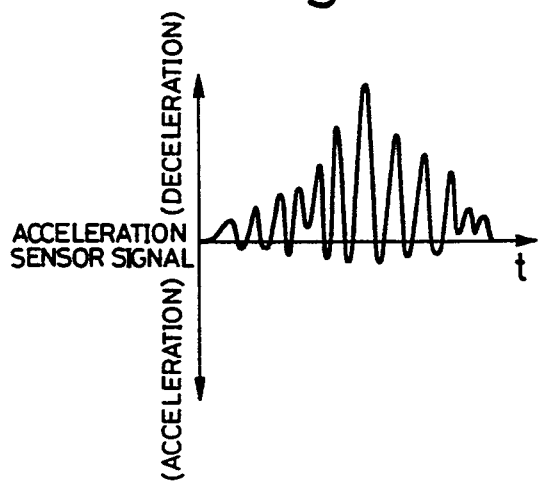
FIG. 4(A) is a diagrammatical illustration showing a signal of the acceleration sensor upon collision of the vehicle.
Figure 4B:
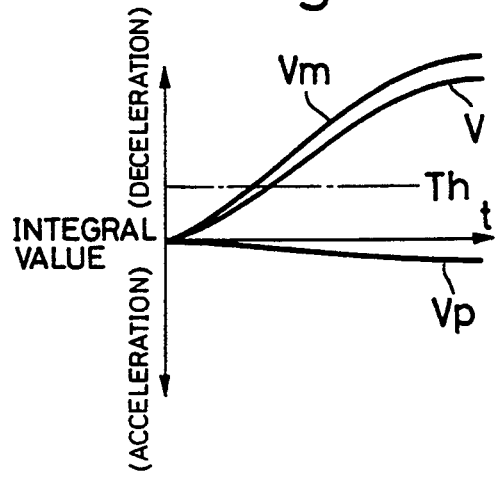
FIG. 4(B) is a diagrammatical illustration showing an integral value of the acceleration, an integral value of the deceleration and a total integral value which are calculated based on the signal of FIG. 4(A)

The sensor signal G, produced upon collision of the vehicle, is extremely biased toward the decelerating direction, as shown in FIG. 4A. Therefore, the deceleration integral value Vm is greater than the acceleration integral value Vp, and the difference between the two, that is, the total integral value $\Delta V$, becomes large to exceed the threshold level Th, and also the integral value ratio R becomes large to exceed the predetermined value $\alpha$. As a result, the trigger signal is outputted to expand the air bag. The predetermined value $\alpha$ is so determined that at the time of the vehicle collision, the integral value ratio R exceeds the predetermined value $\alpha$ before the total integral value $\Delta V$ exceeds the threshold level Th.

Figure 5:
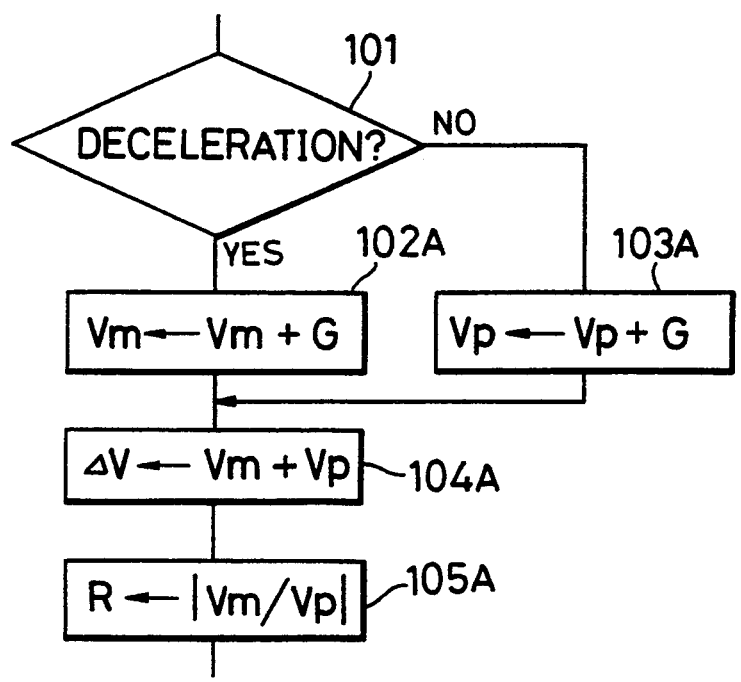
FIGS. 5 to 7 are flow charts showing a portion of modified interrupt routines, respectively.

The present invention is not limited to the above embodiment, and various modifications can be made. For example, Steps 102 to 105 of the routine of FIG. 2 may be replaced by Steps 102A to 105A shown in FIG. 5. More specifically, by adding the sensor signal G, the deceleration integral value Vm is calculated (Step 102A), and also the acceleration integral value Vp is calculated (Step 103A). Therefore, the acceleration integral value Vp represents a negative value. The total integral value $\Delta V$ is obtained by adding the deceleration integral value Vm to the acceleration integral value Vp (Step 104A). The integral value ratio R is the absolute value of the value obtained by dividing the deceleration integral value Vm by the acceleration integral value Vp (Step 105A).

Figure 6:
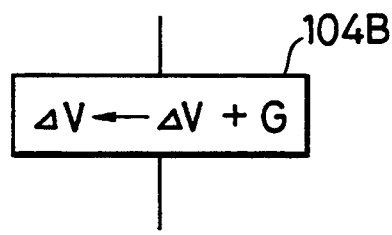

Step 104 of the routine of FIG. 2 may be replaced by Step 104B shown in FIG. 6. More specifically, the total integral value $\Delta V$ is obtained by adding the sensor signal G to the total integral value $\Delta V$ obtained at the preceding routine.

Figure 7:
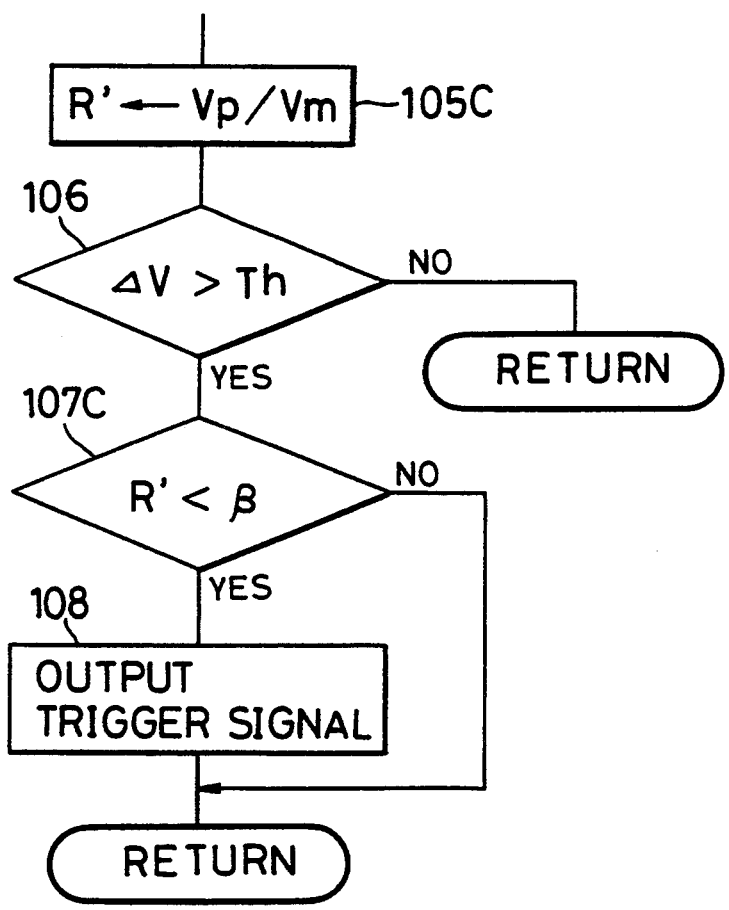

Steps 105 and 107 of the routine of FIG. 2 may be replaced by Steps 105C and 107C shown in FIG. 7. An integral value ratio R' is obtained by dividing the acceleration integral value Vp by the deceleration integral value Vm (Step 105C). If it is judged in Step 107C that the integral value ratio R' is below a predetermined value $\beta$ ($\beta < 1$), the trigger signal is outputted (Step 108).

Figure 8:
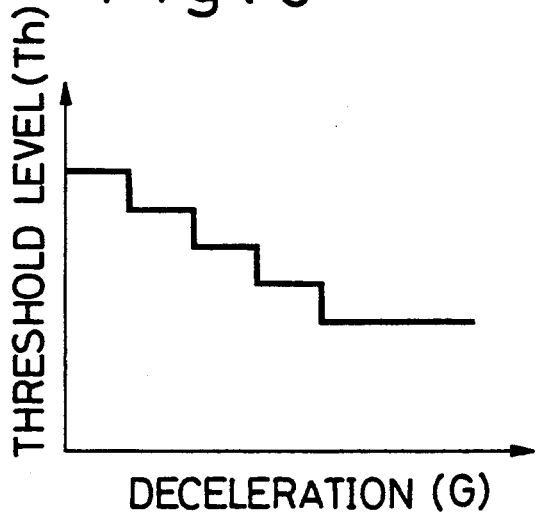
FIG. 8 is a diagrammatical illustration showing a modified threshold level.

As shown in FIG. 8, the threshold level Th may be so determined as to decrease as the sensor signal G increases in the decelerating direction. With this arrangement, in the case of a strong collision producing a large deceleration, the air bag can be expanded more rapidly because the threshold level is low. In the case of a weak collision which produces a sufficiently small deceleration that the air bag does not need to be expanded, an erroneous expansion of the air bag can be more positively prevented, because the threshold level is high. In this case, an erroneous expansion of the air bag upon application of a hammer blow producing the sensor signal with a large amplitude becomes a serious problem; however, this problem can be solved by the above-mentioned additional requirement.

The control system of the present invention can be applied not only to the air bag but also to a pre-tensioner.

What is claimed is:

1. A control system for a vehicle safety device comprising:
    (a) an acceleration sensor for outputting a signal representative of acceleration of a vehicle when the vehicle is accelerated and for outputting a signal representative of deceleration of the vehicle when the vehicle is decelerated;
    (b) total integral value calculation means for effecting an integral calculation in accordance with said signal from said acceleration sensor to produce a total integral value representative of a change in speed of the vehicle;
    (c) first comparison means for comparing said total integral value with a threshold level;
    (d) deceleration integrating means for integrating the deceleration component of said signal from said acceleration sensor to produce a deceleration integral value;
    (e) acceleration integrating means for integrating the acceleration component of said signal from said acceleration sensor to produce an acceleration integral value;
    (f) second comparison means for comparing said deceleration integral value with said acceleration integral value; and
    (g) trigger signal outputting means for outputting a trigger signal to the vehicle safety device when said first comparison means judges that said total integral value increasing in the decelerating direction exceeds said threshold level, and said second comparison means judges that said deceleration integral value becomes predetermined times greater than said acceleration integral value.

2. A control system according to claim 1, in which said second comparison means comprises integral value ratio calculation means for producing an integral value ratio by dividing said deceleration integral value by said acceleration integral value, and integral value ratio comparison means for comparing said integral value ratio with a constant greater than 1.

3. A control system according to claim 1, in which said second comparison means comprises integral value ratio calculation means for producing an integral value ratio by dividing said acceleration integral value by said deceleration integral value, and integral value ratio comparison means for comparing said integral value ratio with a constant smaller than 1.

4. A control system according to claim 1, in which said total integral value calculation means comprises said acceleration integrating means, said deceleration integrating means, and auxiliary calculating means for obtaining said total integral value substantially in accordance with the difference between the absolute value of the deceleration integral value, obtained by said deceleration integrating means, and the absolute value of the acceleration integral value obtained by said acceleration integrating means.

5. A control system according to claim 1, in which said total integral value calculation means is independent of said acceleration integrating means and said deceleration integrating means, and integrates said signal of said acceleration sensor representing the acceleration and the deceleration, thereby producing the total integral value.

* * * * *